No. 885,245. PATENTED APR. 21, 1908.
J. HAGMÜLLER.
DEVICE FOR SEPARATING IRON PARTICLES FROM CHAFF AND THE LIKE
BY MEANS OF MAGNETS.
APPLICATION FILED JAN. 2, 1908.

Witnesses:

Inventor:
Joseph Hagmüller

UNITED STATES PATENT OFFICE.

JOSEPH HAGMÜLLER, OF ALLENSBACH, GERMANY.

DEVICE FOR SEPARATING IRON PARTICLES FROM CHAFF AND THE LIKE BY MEANS OF MAGNETS.

No. 885,245.  Specification of Letters Patent.  Patented April 21, 1908.

Application filed January 2, 1908. Serial No. 409,050.

*To all whom it may concern:*

Be it known that I, JOSEPH HAGMÜLLER, a subject of the German Emperor, and resident of Allensbach, Germany, have invented a Device for Separating Iron Particles from Chaff and the Like by Means of Magnets, of which the following is a specification.

It is known to guide chaff and the like in hay cutting machines from a catching device over a number of magnets by means of which the iron particles are attracted when the chaff or the like slides over the said magnets.

The special catching device and manner of guiding the chaff or the like over the magnets as also these latter, are costly, while the arrangement of magnets by the side of the knives is much cheaper.

The present invention relates to a device for separating the iron particles from chaff or the like, in which the magnets are arranged close to the knives so, as to attract the iron particles within their influence and to retain them directly the chaff is cut, and before it falls to the ground.

In the accompanying drawing is shown a constructional form of the present invention.

Figure 1:
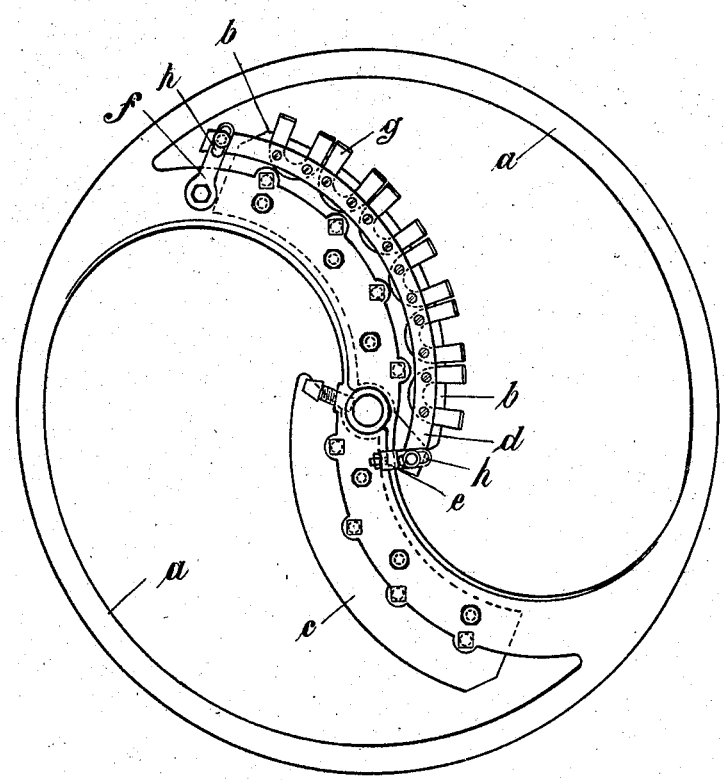
Figure 2:
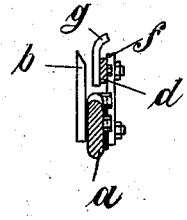

Figure 1 shows a front elevation of the device. Fig. 2 shows a section of the device through a spoke of the fly wheel.

*a* is a spoked fly wheel, *b*, *c* are the knives attached to the spokes thereof. About three centimeters from the knives there run parallel thereto, scythe like iron bars *d*, which are adjustably mounted at their ends in slots *h* provided in fittings *e*, *f* fixed to the spokes of the fly wheel *a*.

To the iron bar *d*, are fixed by means of screws, horse shoe magnets *g* which are arranged close to one another on the inner side of the iron bar, *i. e.*, between the iron bar and the knife, in such a manner that the poles of the magnet project a few centimeters beyond the knife edge. The projecting poles of the magnets are curved away from the knives so that they do not come in contact with the straw in the machine and thus the iron particles hanging on the magnets are not brushed off. The fittings *e*, *f* can be insulated from the fly wheel spokes and are provided with slots *h* by means of which the iron bars can be adjusted to suit the width of knife. In the drawing, the device is only shown attached to a fly wheel.

When using the machine, the iron particles and the like are attracted by the magnets as soon as the chaff is moved forward on the bench, therefor before the knife can cut the chaff as the magnets project beyond the knives. The direction of flight of the iron particles is therefore ascertained before the cutting commences. As the magnets are as close as possible to the knives, the magnetic field is so powerful that it is almost impossible for iron particles to escape with the cut chaff. The magnets can be attached to any chaff cutting machine without any great skill. They also act as guards for the knives and thus also prevent a number of accidents from occurring.

Having now fully described my invention, what I claim and desire to secure by Letters Patent is:—

A device for separating iron particles from chaff, comprising in combination, a spoked fly wheel, knives attached to the spokes, fittings provided with slots fixed to the spokes, scythe like iron bars adjustably mounted in the slots, magnets fixed on the inner side of the iron bars, said magnets being bent away from and projecting beyond the knives, substantially as described and shown and for the purpose set forth.

In testimony whereof I have hereunto set my hand in the presence of two subscribing witnesses.

JOSEPH HAGMÜLLER.

Witnesses.
   N. R. SHANK,
   Jos. H. LEUTE.